(12) United States Patent
Ohkoshi et al.

(10) Patent No.: US 11,054,068 B2
(45) Date of Patent: Jul. 6, 2021

(54) CONNECTION STRUCTURE FOR FIRE EXTINGUISHING SYSTEM PIPING

(71) Applicant: SENJU SPRINKLER CO., LTD., Tokyo (JP)

(72) Inventors: Hisayoshi Ohkoshi, Tokyo (JP); Yukihiro Kon, Tokyo (JP)

(73) Assignee: SENJU SPRINKLER CO., LTD., Tokyo (JP)

( * ) Notice: Subject to any disclaimer, the term of this patent is extended or adjusted under 35 U.S.C. 154(b) by 300 days.

(21) Appl. No.: 16/309,613

(22) PCT Filed: Jun. 15, 2017

(86) PCT No.: PCT/JP2017/022059
§ 371 (c)(1),
(2) Date: Dec. 13, 2018

(87) PCT Pub. No.: WO2017/217479
PCT Pub. Date: Dec. 21, 2017

(65) Prior Publication Data
US 2019/0264842 A1   Aug. 29, 2019

(30) Foreign Application Priority Data

Jun. 16, 2016 (JP) .............................. JP2016-119438

(51) Int. Cl.
  *F16L 15/00* (2006.01)
  *A62C 35/68* (2006.01)
  *F16L 15/04* (2006.01)
(52) U.S. Cl.
  CPC ............ *F16L 15/008* (2013.01); *A62C 35/68* (2013.01); *F16L 15/04* (2013.01); *F16L 2201/10* (2013.01)
(58) Field of Classification Search
  CPC ............................ F16L 15/008; F16L 2201/10
  (Continued)

(56) References Cited

U.S. PATENT DOCUMENTS 4,093,281 A * 6/1978 Jansen, Jr. ............ E21B 17/085
  285/334
2003/0201639 A1* 10/2003 Korkor ............... F16L 19/0237
  285/81
(Continued)

FOREIGN PATENT DOCUMENTS

JP  S6018384 U  2/1985
JP  H0434591 U  3/1992
(Continued)

OTHER PUBLICATIONS

International Search Report (with English Translation) and Written Opinion issued in corresponding International Patent Application No. PCT/JP2017/022059, 11 pages, dated Sep. 12, 2017.
(Continued)

*Primary Examiner* — Aaron M Dunwoody
(74) *Attorney, Agent, or Firm* — Buchanan, Ingersoll & Rooney PC

(57) ABSTRACT

In a connection structure for fire extinguishing system piping in which a male piping member is connected to a connection opening portion of a joint by screwing a male thread and a female thread together, the male piping member includes a joint cylinder having a protruding portion that is inserted deeper into the connection opening portion than the female thread. Each male piping member and the connection opening portion includes a step portion. The connection structure further includes an indicator that engages the step portions and in a state in which the male piping member and the connection opening portion are connected together. At least one of the male piping member and the connection opening portion includes an unmountable portion that has an outside diameter different from an inside diameter of the indicator and cannot be engaged by the indicator.

21 Claims, 7 Drawing Sheets

(58) Field of Classification Search
USPC .................................... 285/81, 89, 82, 93
See application file for complete search history.

(56) References Cited

U.S. PATENT DOCUMENTS

2006/0151994 A1* 7/2006 Marc ................ F16L 19/005
                                                                         285/92
2016/0358517 A1* 12/2016 Pate ................. G09F 3/0295

FOREIGN PATENT DOCUMENTS

| | | | |
|---|---|---|---|
| JP | 05164277 | A | 6/1993 |
| JP | H0559087 | U | 8/1993 |
| JP | H0647796 | U | 6/1994 |
| JP | 06226382 | A | 8/1994 |
| JP | H09294822 | A | 11/1997 |
| JP | 10118219 | A | 5/1998 |
| JP | 11006596 | A | 1/1999 |
| JP | 2006226532 | A | 8/2006 |
| JP | 2007309450 | A | 11/2007 |
| JP | 2008286369 | A | 11/2008 |
| JP | 2015047472 | A | 3/2015 |
| JP | 2015174494 | A | 10/2015 |

OTHER PUBLICATIONS

Office Action (Notice of Reasons for Refusal) dated Mar. 24, 2020, by the Japanese Patent Office in corresponding Japanese Patent Application No. 2017-079327, and an English Translation of the Office Action. (9 pages).

\* cited by examiner

CONNECTION STRUCTURE FOR FIRE EXTINGUISHING SYSTEM PIPING

TECHNICAL FIELD

The present invention relates to fire extinguishing system piping that supplies water for extinguishing a fire to, for example, sprinkler heads.

BACKGROUND ART

A sprinkler system is installed in buildings, shopping centers, or the like and includes components, such as a water tank for storing water for extinguishing a fire, sprinkler heads for splashing water, fire extinguishing system piping that connects the water tank to the sprinkler heads, and a pump for delivering water from the water tank to the sprinkler heads. Pressurized water is filled in the fire extinguishing system piping.

The sprinkler heads are normally installed at high positions away from the floor mainly on a ceiling surface, or immediately under the roof in the case of a building having no ceiling, such as a warehouse. Accordingly, the fire extinguishing system piping for delivering water from the water tank to the sprinkler heads is also installed at height in a room. When carrying out pipe connection work, workers use a boom lift to move to a high position and turn their face upward. In general, installation work of the fire extinguishing system piping is a type of work using an unstable work platform at height, which imposes a considerable burden on workers. Securing work safety is an important issue.

In the fire extinguishing system piping, a main pipe that continues to the water tank is branched by multi-port joints, and the multi-port joints are connected to the sprinkler heads via flexible tubes, such as metal flexible pipes or plastic pipes. The size of the flexible tube and connection openings of the multi-port joint to be used is 16 A to 25 A. A tapered pipe thread is formed in each connection opening of the multi-port joint. Connection work is carried out in such a manner that a sealing tape is wound around a thread portion and the thread is screwed by applying a predetermined torque. The sealing tape is jammed between thread ridges, and sealing capability for cutting off water leakage is thereby obtained.

However, water leakage may occur if an unskilled worker carries out such connection work. If leakage occurs, the connection work is carried out again, which leads to a decrease in work efficiency. In the connection work, a special tool needs to be used for applying a predetermined torque to screw threads together. More specifically, a metal wrench or spanner for this purpose is used in the connection work. This considerably increases the burden on a worker because the worker connects flexible tubes to a plurality of connection openings of each multi-port joint that is installed above the worker's head by using a heavy tool made of metal.

In order to improve work efficiency and reduce the worker's burden, it is known to use, for example, a quick pipe joint that does not use threads (for example, see PTL 1) or a plastic pipe capable of fusion splicing (for example, see PTL 2). However, the fusion splicing requires a special fusion apparatus that serves as a heat source for fusing plastic pipes, which is not suitable for the connection work at height. In the case of using such a joint, if the pipe should be detached from the joint due to a faulty connection, a large amount of water would be discharged into a room and would cause water damage. Accordingly, the risk of the water damage due to defective work may be considered to be smaller for the case of the connection structure using threaded joints.

Another point is that there may be a case in which an inspector, such as a site supervisor, checks connection portions after the connection work is completed in order to assure, at contractor's level, that piping members are joined securely to each other. However, it requires a large amount of time and effort for the inspector to check each of the connection portions between the piping members and the multi-port joints by using a scaffold such as a step ladder or using a boom lift.

Moreover, cables, lighting equipment, ducts, or the like are installed around the fire extinguishing system piping in the building construction process after the connection between the flexible tubes and the multi-port joints until the installation of a ceiling framework. To avoid interfering the installation work of such items, the flexible tubes connected to the fire extinguishing system piping are normally left in a coiled state. After the installation of the ceiling framework, each of the flexible tubes is extended to a sprinkler head installed at a predetermined position in the ceiling framework. During installation of cables, lighting equipment, or the like, a thing may hit the flexible tube by accident, or when coiling a flexible tube or uncoiling a flexible tube for fixing to the ceiling framework, an excessive load may be applied to a piping member such as the flexible tube or a joint. In such cases, the flexible tube or the connection portion between the flexible tube and the multi-port joint may be broken and water leakage may occur. Even if a damaged portion does not leak water, an impact from fluid flowing inside the pipe may cause water leakage when the fire extinguishing system piping is subjected to an abnormal increase in pressure or a water hammer after the installation is completed.

PTL 3 discloses a band 71 to be mounted on a connection portion between pipes (see FIG. 11). The band 71 is a C-shaped clip. The band 71 is installed in such a manner that engagement slits 72 are coupled to engagement flanges 74 and two bands 71 nip the engagement flanges 74. However, if the band 71 is mounted, for example, on a flexible pipe 75 by mistake, the band 71 remains to hold the flexible pipe 75 wrongly because the clearance between the ends 73 of the band 71 is small and retaining forces exerted by a spring of the band 71 is strong. In the fire extinguishing system piping, pipes are installed substantially parallel to the ceiling or the floor. The band 71 does not move by its own weight and is not easily detached. A worker or an inspector may not notice that the band 71 is installed wrongly.

CITATION LIST

Patent Literature

PTL 1: Japanese Unexamined Patent Application Publication No. 2006-226532
PTL 2: Japanese Unexamined Patent Application Publication No. 10-118219
PTL 3: Japanese Unexamined Patent Application Publication No. 5-164277

SUMMARY OF INVENTION

Technical Problem

The present invention has been conceived with the above-described background. In other words, an object of the present invention is to provide fire extinguishing system piping and a connection structure thereof in which stable sealing performance can be obtained by using screw engagement even if an unskilled worker carries out connection work. Another object of the present invention is to provide fire extinguishing system piping and a connection structure thereof in which secure engagement of a connection portion can be confirmed easily.

Solution to Problem

In order to achieve the above objects, the present invention provides a connection structure for fire extinguishing system piping as below.

The connection structure for the fire extinguishing system piping includes a male piping member that is used for the fire extinguishing system piping and has a male thread, a female piping member that is used for the fire extinguishing system piping and has a female thread into which the male thread is screwed, and an indicator. In the connection structure, the male piping member and the female piping member are connected together by screwing the male thread and the female thread together. In addition, the male piping member includes a joint member having a protruding portion that protrudes further toward an inside of the female piping member than the male thread and is inserted deeper into the female piping member than the female thread, and a sealing member that comes into contact with an outer periphery of the protruding portion and with an inner periphery of the female piping member and seals a screw engagement portion between the male thread and the female thread against water leakage into the inside of the female piping member. The male piping member also includes a first engagement portion on the outer periphery thereof. Moreover, the female piping member includes a second engagement portion on an outer periphery thereof. Furthermore, the indicator includes a pair of rings that engage respective ones of the first engagement portion and the second engagement portion in a state in which the male piping member and the female piping member are connected together and a retaining portion that connects the pair of the rings together and has a length corresponding to a distance between the first engagement portion and the second engagement portion that are disposed adjacently.

According to the present invention, the male piping member includes a joint member having a protruding portion that protrudes further toward the inside of the female piping member than the male thread and is inserted deeper into the female piping member than the female thread, and also includes a sealing member that comes into contact with an outer periphery of the protruding portion and with an inner periphery of the female piping member and seals a screw engagement portion between the male thread and the female thread against water leakage into the inside of the female piping member. Accordingly, the sealing member disposed on the protruding portion comes into contact with the inner periphery of the female piping member and cuts off water at a position deeper than the engagement portion between the male thread and the female thread. Thus, water leakage from the inside of the female piping member to the engagement portion can be prevented.

In addition, according to the present invention, the sealing member is disposed on the protruding portion of the male piping member. This eliminates the necessity of mounting a sealing member, such as a sealing ring having rubber elasticity, on the inner periphery of the female piping member at a position away from the end of the female piping member into which the protruding portion is inserted, which can make the production easier. A sealing ring or the like having rubber elasticity can be used as the sealing member to be disposed on the protruding portion, which can eliminate the sealing work that requires skills in winding a tape around at height. Thus, the worker's burden in the connection work can be reduced, and the connection work can be carried out easily.

The connection work of the male piping member and the female piping member involves screw engagement of the male thread and the female thread, which can be carried out easily by a worker. Moreover, the screw engagement causes the sealing member to achieve sealing inside the female piping member. In other words, the sealing work is completed simultaneously during the connection work.

Regarding the indicator, the retaining portion has a length corresponding to the distance between the first engagement portion and the second engagement portion. Accordingly, unless the male thread and the female thread engage each other appropriately, a pair of the rings cannot engage the first engagement portion and the second engagement portion. Thus, the indicator cannot be mounted. Accordingly, by observing the mounting state of the indicator, the worker can easily confirm that the male thread and the female thread are screwed together appropriately.

Each of the pair of the rings may be configured to be shaped like a horseshoe and has curved ends at respective ends thereof, and the curved ends may be curved inward and serve to prevent the pair of the rings from coming off the first engagement portion and the second engagement portion.

According to the present invention, the curved ends that are curved inward engage the first engagement portion and the second engagement portion so as not to come off. The pair of the rings are thereby prevented from coming off the first engagement portion and the second engagement portion. Thus, the indicator can be prevented from dropping off.

The pair of the rings may be configured to hold the first engagement portion and the second engagement portion so as to press and nip the first engagement portion and the second engagement portion in a state in which the pair of the rings engage the first engagement portion and the second engagement portion.

According to the present invention, the pair of the rings press and nip the first engagement portion and the second engagement portion, and thereby the indicator does not come off easily. Thus, the indicator can be mounted securely on the connection portion between the male piping member and the female piping member.

The retaining portion may be configured to have a pair of first retaining portions that are disposed on a circumference of the pair of the rings so as to oppose each other and a second retaining portion that is disposed at a position between the pair of the first retaining portions on the circumference of the pair of the rings.

According to the present invention, the first retaining portions are disposed opposingly on the circumference of the pair of the rings. The pair of the rings, which also oppose each other, can thereby nip and hold the first engagement portion and the second engagement portion. Moreover, the second retaining portion is disposed on the circumference between the paired first retaining portions. The connection portion between the male piping member and the female piping member can be thereby held at least in three directions, and the indicator can be mounted more securely.

The male piping member may be configured to have a holder portion that holds the joint member rotatably.

According to the present invention, the joint member is rotatable inside the holder portion of the male piping member. In a case in which a relatively long pipe is connected to the joint member in advance, the male thread can be screwed to the female thread by rotating only the male piping member without rotating the joint member.

The connection can be achieved by rotating only the male piping member without rotating the joint member. This eliminates the likelihood of the sealing member disposed on the joint member rotating together with the joint member and sliding against the inner periphery of the female piping member during screw engagement between the male thread and the female thread. Thus, while the sealing member mounted on the protruding portion is maintained in a good mounting condition, the sealing member can achieve sealing by coming into contact with the inner periphery of the female piping member.

In addition, since the joint member is rotatable while screwing the male thread and the female thread together, even if a load due to twisting or bending is applied to the pipe, the joint member can rotate and thereby reduce the load applied to the pipe.

According to the present invention, the male piping member may be configured to have a first annular projection at a position adjacent to the first engagement portion on a side of the male piping member to which the female piping member is connected, and the female piping member may be configured to have a second annular projection at a position adjacent to the second engagement portion on a side of the female piping member to which the male piping member is connected. In addition, the first annular projection and the second annular projection may be configured to come into contact with each other in a state in which the male piping member and the female piping member are connected together and thereby form a flanged projection in which the pair of the rings nip respective annular side surfaces of the first annular projection and the second annular projection while the retaining portion is in press-contact with outer peripheries thereof.

When the male piping member and the female piping member are connected together appropriately, the first annular projection and the second annular projection are superposed on each other and forms the flanged projection. The indicator is brought into press-contact with the outer periphery of this flanged projection, and the pair of the rings nip the annular side surfaces. Accordingly, unless the male piping member and the female piping member are connected together appropriately, the flanged projection is not formed, and the indicator is not mounted thereon. Thus, whether the male piping member and the female piping member are connected together appropriately or not can be confirmed by using the indicator.

The joint member may be configured to have a flexible tube that is connected to an end of the joint member that is opposite to the protruding portion to be inserted into the female piping member.

According to the present invention, the flexible tube is connected to the joint member. A fire extinguishing system including sprinkler heads or the like can be installed easily by taking advantage of the flexibility of the flexible tube.

The male piping member may be configured to have a tubular cover portion that covers a connection portion between the joint member and the flexible tube.

According to the present invention, water leakage can be prevented while the tubular cover portion protects the connection portion from external forces and maintains the connection portion in an appropriate condition.

The connection structure for fire extinguishing system piping may be configured to include an allowance gap that is provided between the tubular cover portion and the connection portion and that allows bending deformation of the flexible tube.

According to the present invention, the allowance gap allows the flexible tube to bend. Thus, appropriate pipe arrangement can be achieved by taking advantage of the flexibility of the flexible tube. The tubular cover portion also functions to restrict the range of motion of the flexible tube that bends within the allowance gap. Accordingly, the tubular cover portion protects the flexible tube and the connection portion from excessive bending.

The female piping member may be configured to be a connection opening portion of a multi-port joint.

According to the present invention, even in the case of a multi-port joint having multiple connection opening portions, a worker can connect flexible pipes securely to the multi-port joint without permitting water leakage and carry out the connection work easily and quickly. Moreover, the worker can easily confirm the appropriateness of the connection between the male piping member and the female piping member by observing the indicator.

The male piping member may be configured to further include a first unmountable portion that is disposed at a position adjacent to the first engagement portion and has an outside diameter different from respective inside diameters of the rings and that the rings are unable to engage.

According to the present invention, even if the rings are forcibly mounted at a position away from the first engagement portion, the first unmountable portion having an outside diameter different from the inside diameter of the rings prevents the rings from being mounted thereon. Thus, in the present invention, the rings can be mounted appropriately on the first engagement portion.

The female piping member may be configured to further include a second unmountable portion that is disposed at a position adjacent to the second engagement portion and has an outside diameter different from the respective inside diameters of the rings and that the rings are unable to engage.

According to the present invention, even if the rings are forcibly mounted at a position away from the second engagement portion, the second unmountable portion having an outside diameter different from the inside diameter of the rings prevents the rings from being mounted thereon. Thus, in the present invention, the rings can be mounted appropriately on the second engagement portion.

Advantageous Effects of Invention

According to the present invention, the connection work can be made easier, and stable sealing performance can be obtained even by the connection work carried out by an unskilled worker. Thus, the connection work of the fire extinguishing system piping at height can be carried out reliably and easily.

Moreover, according to the present invention, the appropriate engagement of the connection portion between the male piping member and the female piping member can be confirmed easily by using the indicator. Thus, inspection of the connection portions of the fire extinguishing system piping that is installed at height can be conducted easily and reliably.

BRIEF DESCRIPTION OF DRAWINGS

FIG. 5 is a diagram illustrating an indicator in FIG. 2, in which

FIG. 8 is a diagram illustrating an indicator in FIG. 7, in which

DESCRIPTION OF EMBODIMENTS

Figure 1:
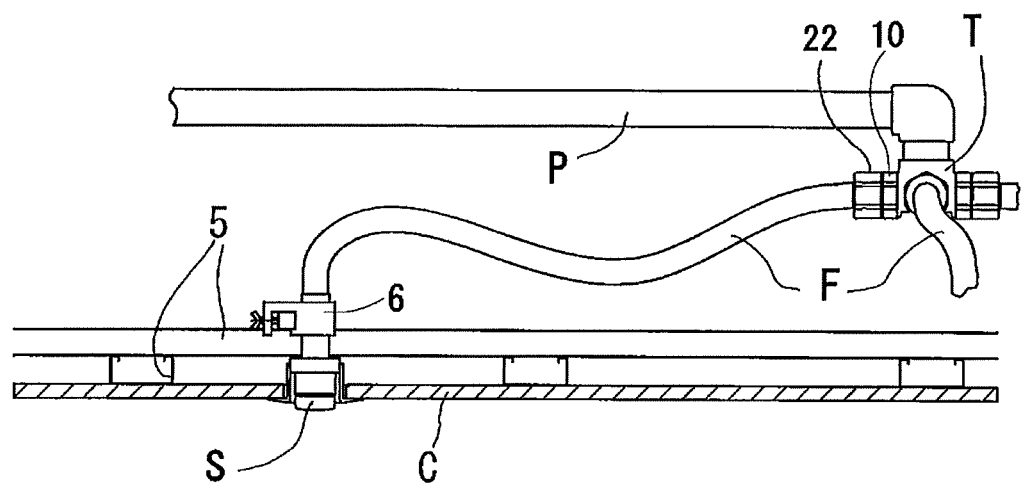
FIG. 1 is a diagram illustrating installation and connection states of fire extinguishing system piping according to an embodiment.

Embodiments of a connection structure for fire extinguishing system piping according to the present invention will be described with reference to the drawings. In the following embodiments, a connection structure between a multi-port joint T and a flexible pipe F will be described by way of example. Note that terms "first", "second", "third", and "fourth", which are prefixed to names of elements of the invention as used in the present specification and claims, do not indicate any specific order of the elements described thereafter. These terms are used solely to distinguish elements having the same name from each other. Like elements are denoted by like reference numerals among embodiments, and duplicated description on detailed configurations, operation, and effects will be thereby omitted.

First Embodiment (FIG. 1 to FIG. 6)

As illustrated in FIG. 1, a connection opening portion 10 that is provided on a side of the multi-port joint T is connected to an end of a flexible pipe F that is made of a metal. The other end of the flexible pipe F is connected to a sprinkler head S. A connection opening portion 8 provided at the top end of the multi-port joint T is connected to water piping P, and the water piping P is connected to a water-supply system that includes a pump and a water source (not illustrated).

The sprinkler head S is installed such that an end thereof is exposed from a ceiling panel C to a room. The ceiling panels C is supported by a ceiling framework 5, and the sprinkler head S is also fixed to the ceiling framework 5 with a metal fixture 6. Ducts, wiring, lighting equipment (not illustrated) are disposed around the water piping P and the flexible pipe F above the ceiling framework 5.

In FIG. 1, the flexible pipe F is in an extended state. However, the flexible pipe F is coiled before the sprinkler head S is installed in the ceiling framework 5. A flexible pipe F, otherwise called a "flexible tube", is a pleated flexible tube that is made of metal and is flexibly bendable. In place of the metal flexible tube, a plastic pipe may be used.

Figure 2:
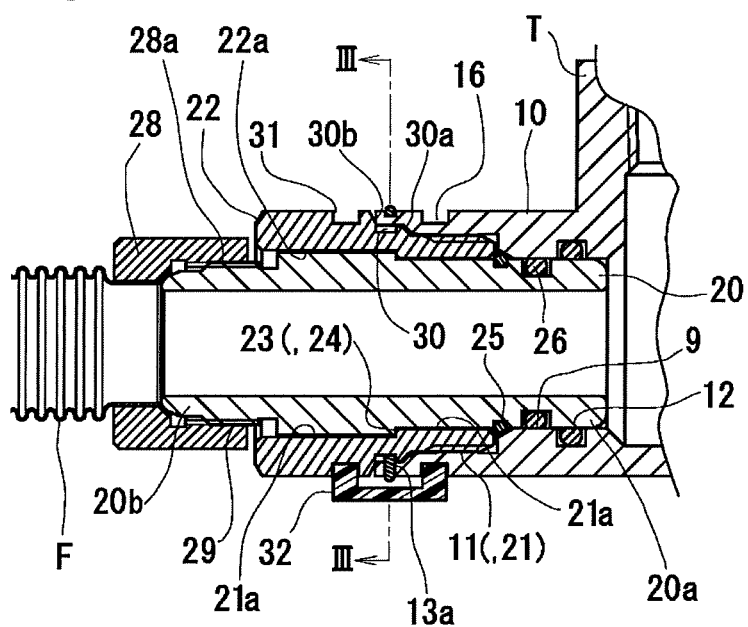
FIG. 2 is a cross-sectional view illustrating a connection structure for the fire extinguishing system piping according to the first embodiment.
Figure 4:
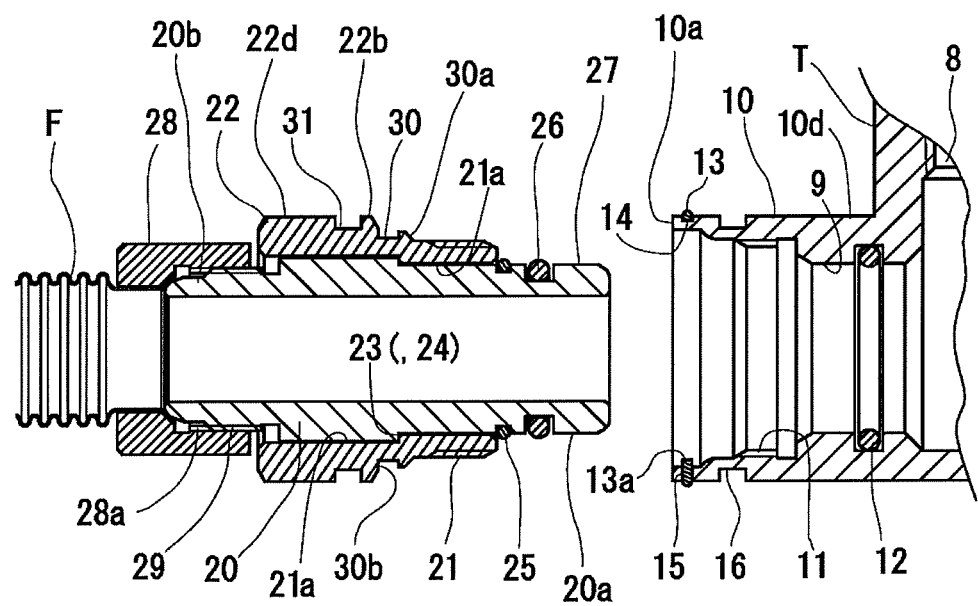
FIG. 4 is a cross-sectional view illustrating a state before the fire extinguishing system piping illustrated in FIG. 2 is connected.

The multi-port joint T is formed as a hollow pipe of which the connection opening portion 8 at the top end thereof is connected to the water piping P. The sides of the multi-port joint T are provided with two to six connection opening portions 10, each of which serves as a "female piping member". In the present embodiment, the multi-port joint T is provided with four connection opening portions 10 that are arranged radially. FIGS. 2 and 4 are enlarged cross-sectional views illustrating a connection portion between the multi-port joint T and the flexible pipe F. A female thread 11 is formed inside the connection opening portion 10 of the multi-port joint T. A first O-ring 12, which serves as a "sealing member", is disposed at a position deeper than the female thread 11 when the female thread 11 is viewed from an opening edge portion 10a of the connection opening portion 10. A portion between the female thread 11 and the first O-ring 12 is a sealing surface 9 with which a second O-ring 26 of a joint cylinder 20, which will be described later, comes into contact.

A locking ring 13 is disposed at a position shallower than the female thread 11, in other words, at the opening edge portion 10a of the connection opening portion 10. The locking ring 13 is disposed inside an annular groove 14 (FIGS. 3 and 4) that are formed on the outer periphery of the connection opening portion 10.

Figure 3:
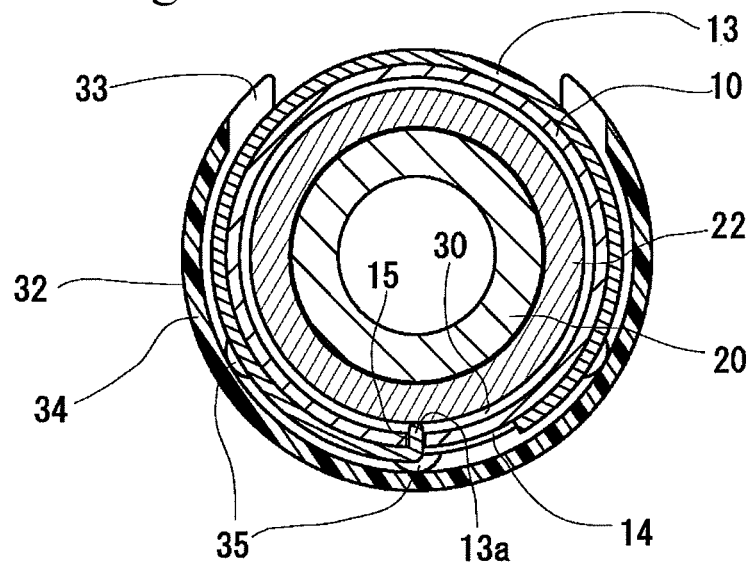
FIG. 3 is a cross section taken along line in FIG. 2.

The locking ring 13, which is made of a wire material having spring elasticity, such as a metal wire, functions as a stopper that suppresses loose engagement of the female thread 11 and a male thread 21. The locking ring 13 is shaped like a semi-ring having ends as illustrated in FIG. 3. A lock portion 13a is disposed at an end of the locking ring 13. The lock portion 13a is formed by bending an end of the wire material toward the center of the semi-ring.

The lock portion 13a is inserted into a lock hole 15 that passes through from the annular groove 14 to the inner periphery of the connection opening portion 10. In the state in which the locking ring 13 is disposed in the annular groove 14, the lock portion 13a protrudes from the inner periphery of the connection opening portion 10 toward the inside thereof. The depth of the annular groove 14 is smaller than the thickness of the locking ring 13. Accordingly, the locking ring 13 projects outward from the upper opening of the annular groove 14 in the state in which the locking ring 13 is installed in the annular groove 14. The locking ring 13 can be removed easily from the annular groove 14 by using a tool having a pointy end, a flathead screwdriver, or the like.

A recess 16, which serves as a "second engagement portion", is provided at a position deeper than the annular groove 14 when viewed from the opening edge portion 10a of the connection opening portion 10. The recess 16 is formed as an annular groove that extends in the circumferential direction on the outer periphery of the connection opening portion 10. The opening edge portion 10a, which is located adjacent to the recess 16, is formed as a "second annular projection" that extends in the circumferential direction on the outer periphery of the connection opening portion 10.

An end of the flexible pipe F is welded to the joint cylinder 20, which serves as a "joint member". A male piping member 22 is installed around the joint cylinder 20. The male piping member 22 is shaped into a circular pipe and has the male thread 21 formed on an end thereof (the right end in the figures). The male piping member 22 is connected to an end of the flexible pipe F via the joint cylinder 20.

A step 23 is disposed on the outer periphery of the joint cylinder 20, whereas a step 24 is disposed on the inner periphery of the male piping member 22. The step 23 abuts the step 24 in a direction of inserting the joint cylinder 20 into the connection opening portion 10. Moreover, a snap ring 25 is mounted on the outer periphery of the joint cylinder 20. The end of the male piping member 22 near the male thread 21 is stopped by the snap ring 25. The joint cylinder 20 is thereby held unremovably in a holder portion 22a of the male piping member 22 and also held rotatably relative to the male piping member 22. Accordingly, the flexible pipe F connected to the joint cylinder 20 is also rotatable relative to the male piping member 22.

A gap 21a is provided between a region between the step 23 and the snap ring 25 on the outer periphery of the joint cylinder 20 and the inner periphery of the male piping member 22 near the male thread 21. The female thread 11 and the sealing surface 9 are formed inside the connection opening portion 10. In the case of machining the male thread 21 and the sealing surface 9 in separate processes, the central axes of the male thread 21 and the sealing surface 9 may deviate from each other. However, the gap 21a described above absorbs the deviation of the central axes and thereby enables smooth mounting/unmounting of the male piping member 22.

The end of the joint cylinder 20 near the snap ring 25 installed (the right end in the figures) forms a protruding portion 20a that protrudes from the male piping member 22. The second O-ring 26, which serves as a "sealing member", is mounted on the outer periphery of the protruding portion 20a. The portion of the outer periphery of the protruding portion 20a that is closer to the end thereof than the second O-ring 26 serves as a sealing surface 27 with which the first O-ring 12 disposed inside the connection opening portion 10 comes into press-contact. The edge at the end of the protruding portion 20a is formed into a curved surface. Accordingly, even if the first O-ring 12 rubs against the edge at the end of the protruding portion 20a when the joint cylinder 20 is inserted into the connection opening portion 10, the first O-ring 12 does not receive a scratch.

The end of the joint cylinder 20 that is opposite to the end near the snap ring 25 (the left end in the figures) forms a joint portion 20b to which the flexible pipe F is joined. The joint portion 20b and the flexible pipe F are connected together via a nut 28. The nut 28 is fixed to the flexible pipe F by welding or the like to provide water tightness. A female thread 28a of the nut 28 and a male thread 29 of the joint cylinder 20 engage each other, thereby forming a "connection portion" between the joint cylinder 20 and the flexible pipe F. The nut 28 serves as a "tubular cover portion" that covers the "connection portion".

As described above, the male thread 21 is formed on the outer periphery of the male piping member 22. A groove 30 is formed at the side of the male thread 21 near the nut 28. The groove 30 is formed annularly so as to extend in the circumferential direction of the male piping member 22. The groove 30 receives the end of the lock portion 13a of the locking ring 13 and functions as a step portion for locking the locking ring 13 that serves as a stopper. An inclined surface 30a is formed between the groove 30 and the male thread 21 so as to facilitate engagement of the lock portion 13a of the locking ring 13 with the groove 30.

An edge of the groove 30 that is located opposite to the side on which the inclined surface 30a is disposed is formed into a contact surface 30b. The contact surface 30b comes into contact with the opening edge portion 10a of the connection opening portion 10 when the male thread 21 and the female thread 11 engage each other.

A flanged portion 22b, which serves as a "first annular projection", is formed at a position next to the groove 30 on the outer periphery of the male piping member 22. The flanged portion 22b is formed as an annular projection that extends in the circumferential direction on the outer periphery of the male piping member 22.

A recess 31, which serves as a "first engagement portion", is provided at a position next to the flanged portion 22b. The recess 31 is formed as an annular groove that extends in the circumferential direction on the outer periphery of the male piping member 22. An indicator 32 engages the recess 31 and the recess 16 of the connection opening portion 10. The recess 31 serves as the "first engagement portion", and the recess 16 serves as a "second engagement portion".

Figure 5A:
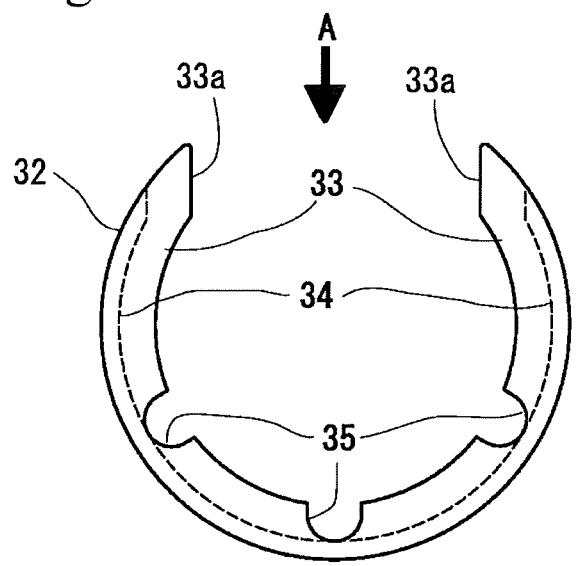
FIG. 5A illustrates an exterior of the indicator and FIG. 5B illustrates the exterior when viewed in the direction of arrow A in FIG. 5A.
Figure 5B:
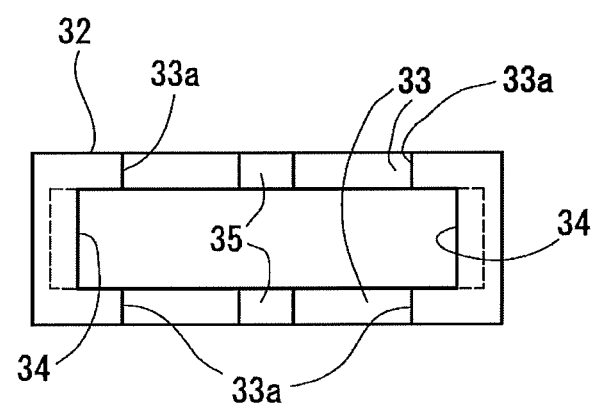

The indicator 32 is formed into a horseshoe shape or a C-shape as illustrated in FIG. 5 and is made of a material having spring elasticity, such as a resin or a metal. A pair of projections 33 that engage the recesses 16 and 31 are formed inside the indicator 32. The projections 33 project toward the center of the indicator 32. The indicator 32 is formed as a ring having a discontinued portion between ends 33a. A pair of the projections 33 are connected together by a thin-walled portion 34. The length of the thin-walled portion 34 that connects the projections 33 to each other corresponds to the distance between the recesses 16 and 31. A plurality of recesses 35 are provided at the inner edge of each of the projections 33. Each of the recesses 35 has a depth from the inner peripheral edge of each projection 33 to the thin-walled portion 34, which facilitates elastic deformation of the indicator 32. The thin-walled portion 34 is not provided at both ends of the indicator 32, in other words, at the ends 33a of a pair of the projections 33. This facilitates easy engagement of the projections 33 with the recesses 16 and 31.

The indicator 32 is a device to indicate that the connection portion between the flexible pipe F and the multi-port joint T is joined securely. The indicator 32 can engage the recesses 16 and 31 in the state in which the male thread 21 and the female thread 11 are screwed together and the contact surface 30b of the male piping member 22 is abutted against the end surface of the opening edge portion 10a of the connection opening portion 10. At this time, the thin-walled portion 34 is disposed so as to straddle the two recesses 16 and 31. When screw engagement between the male thread 21 and female thread 11 is not sufficient, the distance between the recesses 16 and 31 is larger than the distance between the projections 33 (the length of the thin-walled portion 34 between the projections 33). As a result, the projections 33 cannot engage the recesses 16 and 31, thereby indicating that screw tightening is not sufficient. In this case, the male piping member 22 is rotated further in the screw-tightening direction so as to abut the contact surface 30b against the end of the connection opening portion 10. The indicator 32 is mounted on the recesses 16 and 31 thereafter.

Painting the indicator 32 conspicuously with a fluorescent color enables an inspector on the floor to easily confirm the connection state between the multi-port joint T and the flexible pipe F that are installed at height in a building.

Next, a procedure to connect the flexible pipe F to the multi-port joint T will be described.

The multi-port joint T connected to the water piping P has a plurality of the connection opening portions 10. The flexible pipe F is connected to the joint cylinder 20 via the nut 28 in advance. First, the joint cylinder 20 that protrudes from the male piping member 22 is inserted into the connection opening portion 10, and a sealing surface 27 of the joint cylinder 20 is inserted into the inside of the sealing surface 9 of the connection opening portion 10. At this stage, the male thread 21 and the female thread 11 are not engaged yet.

Next, rotating the male piping member 22 screws the male thread 21 into the female thread 11. The joint cylinder 20 gradually moves deeper toward the inside of the connection opening portion 10 and brings the first O-ring 12 and the second O-ring 26 into contact with the respective sealing surfaces 27 and 9. Since the male piping member 22 can rotate relative to the joint cylinder 20, the joint cylinder 20 does not rotate during screw engagement between the male thread 21 and the female thread 11. This suppresses deterioration in water tightness caused due to the first and second O-rings 12 and 26 being twisted by the rotation during the screw engagement. The flexible pipe F, which is connected to the other end of the joint cylinder 20, is not twisted either by the rotation during the screw engagement of the male thread 21 and the female thread 11.

Further rotation of the male piping member 22 causes the joint cylinder 20 to move toward the inside of the connection opening portion 10, and the first O-ring 12 and the second O-ring 26 are thereby collapsed by the respective sealing surfaces 27 and 9. Watertight sealing is formed by the collapse of the first O-ring 12 and the second O-ring 26, which is caused by movement of the joint cylinder 20 due to screw engagement between the male thread 21 and the female thread 11. This leads to a reduction in the burden of workers. Moreover, the first O-ring 12 and the second O-ring 26 come into contact with the respective sealing surfaces 27 and 9 and thereby cut off water at a position deeper than the engagement portion between the male thread 21 and the female thread 11, which can prevent water from leaking into the engagement portion. Furthermore, the second O-ring 26 is mounted on the protruding portion 20a, which eliminates the necessity of disposing the second O-ring 26 inside the connection opening portion 10 and makes the production easier. Using the first O-ring 12 and the second O-ring 26 can eliminate the use of sealing tapes that requires skills for installation and can thereby reduce the burden of workers involved in connection work at height.

In addition, the first O-ring 12 and the second O-ring 26 are disposed in the connection opening portion 10 and on the joint cylinder 20, respectively. As a result, the amount of movement of the joint cylinder 20 that is required to collapse the two O-rings 12 and 26 is no more than an amount required to collapse a single O-ring. This leads to a reduction in the thread length of the male thread 21 and of the female thread 11. This reduction in the thread length is advantageous because it leads to a reduction in the length of the joint portion constituted by the joint cylinder 20 and the male piping member 22 in the pipe axis direction and thereby leads to a further reduction in weight.

When the male thread 21 and the female thread 11 are screwed together, the end of the lock portion 13a of the locking ring 13 deforms elastically outward along the inclined surface 30a of the male piping member 22. Subsequently, the end of the lock portion 13a climbs over the inclined surface 30a and moves into the groove 30. The locking ring 13 thereby assumes a locking state. In this state, even if the female thread 11 is rotated in the screw-loosening direction, the female thread 11 is prevented from rotating further in the screw-loosening direction due to the lock portion 13a and the edge of the groove 30 interfering the rotation.

The male thread 21 and the female thread 11 are parallel threads. The male piping member 22 can be rotated until the contact surface 30b of the male piping member 22 comes into contact with the end surface of the connection opening portion 10. The indicator 32 is installed after the male thread 21 and the female thread 11 are screwed together. By pressing the indicator 32 into the recesses 16 and 31 with the ends 33a of the projections 33 of the indicator 32 moving along the recesses 16 and 31, the indicator 32 deforms elastically due to the presence of the recesses 35, and the distance between opposing ends 33a (discontinued portion) becomes larger. The projections 33 thereby engages the recesses 16 and 31. The indicator 32 thereby nips the annular side surface of the flanged portion 22b of the male piping member 22 and the annular side surface of the opening edge portion 10a of the connection opening portion 10, both of which come into contact with each other and thereby form a "flanged projection" between the recesses 16 and 31.

Note that an outer periphery portion 10d located next to the recess 16 of the connection opening portion 10 is a "second unmountable portion" that has a diameter larger than the inside diameter of the projections 33. Accordingly, the indicator 32 cannot be mounted thereon. Similarly, an outer periphery portion 22d located next to the recess 31 of the male piping member 22 is a "first unmountable portion" that has a diameter larger than the inside diameter of the projections 33. Accordingly, the indicator 32 cannot be mounted thereon.

The indicator 32 assumes the state in which the locking ring 13 is disposed inside the indicator 32. Accordingly, the locking ring 13 cannot be removed without removing the indicator 32, and the male thread 21 and the female thread 11 is thereby prevented from loosening.

In addition, the indicator 32 is formed such that the distance between the opposing ends 33a of a pair of the projections 33 is less than each of the diameters of the locking ring 13 and the recesses 16 and 31. In other words, the ends 33a are formed as "curved ends" that are curved inward. The indicator 32 cannot be removed from the recesses 16 and 31 without opening the ends 33a. Thus, the indicator 32 is mounted securely. In addition, a pair of the projections 33 presses and nips the recesses 16 and 31, thereby holding the recesses 16 and 31. The indicator 32 can be fixed securely to the recesses 16 and 31.

Thus, connection between the multi-port joint T and the flexible pipe F is completed. As described above, the flexible pipes F can be securely connected to the multi-port joint T having multiple connection opening portions 10 without allowing water leakage, while the connection work can be carried out easily and quickly. The ceiling C is installed after the sprinkler head S to which the end of the flexible pipe F is connected is fixed to the ceiling framework 5.

A procedure of removing the flexible pipe F from the multi-port joint T is as follows. First, the indicator 32 is unmounted, and the locking ring 13 is removed from the annular groove 14 accommodating the locking ring 13 therein by using a tool such as a screwdriver. Subsequently, the screw thread is loosened by rotating the male piping member 22. Lastly, the work is completed by pulling the joint cylinder 20 out of the connection opening portion 10.

Figure 6:
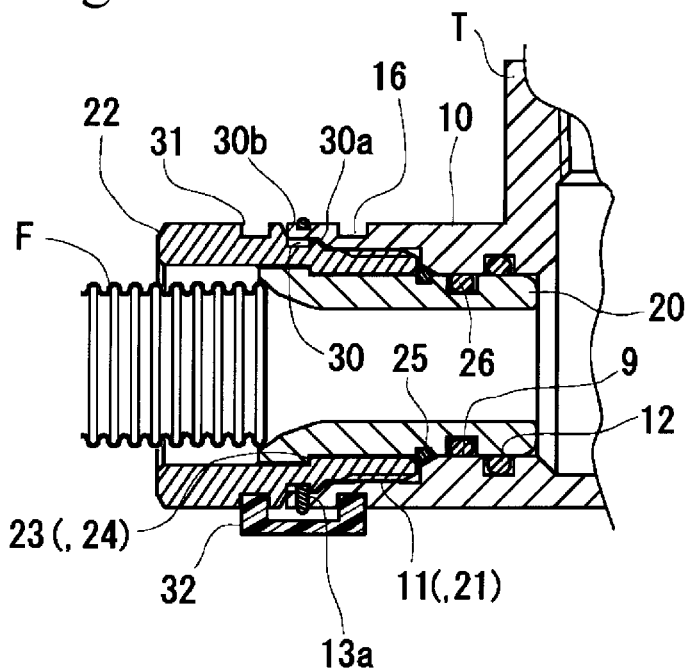
FIG. 6 is a cross-sectional view illustrating a modification of FIG. 2.

In the embodiments described above, the flexible pipe F and the joint cylinder 20 are joined to each other via the nut 28. However, for example, the flexible pipe F and the joint cylinder 20 can be joined together directly by welding or the like as illustrated in FIG. 6.

Second Embodiment (FIG. 7 to FIG. 10)

In this embodiment, a step surface 41 is formed on the protruding portion 20a of the joint cylinder 20. A third O-ring 42 and a fourth O-ring 43, which are different in size, are disposed at different sides of the step surface 41. More specifically, the thickness and the outside diameter of the fourth O-ring 43 is less than those of the third O-ring 42.

A step portion 44 is formed in the connection opening portion 10 at a position corresponding to the step surface 41 of the joint cylinder 20. Straight portions 10b and 10c, which are disposed at positions adjacent to the step portion 44, serve as sealing surfaces for the third O-ring 42 and the fourth O-ring 43. By disposing the third O-ring 42 and the fourth O-ring 43 that are different in size, each thread length of the male thread 21 and the female thread 11 can be reduced, which is the same as the case in the first embodiment. In the first embodiment, the first O-ring 12 is mounted on the inner periphery of the connection opening portion 10, which makes the mounting work difficult. On the other hand, in the second embodiment, the third O-ring 42 and the fourth O-ring 43 are mounted on the outer periphery of the protruding portion 20a, and mounting on the inner periphery of the connection opening portion 10 is not necessary. This is advantageous because the mounting work of the third O-ring 42 and the fourth O-ring 43 is easier. Moreover, the locking ring 13 is omitted in the second embodiment, which results in a simpler configuration.

Figure 7:
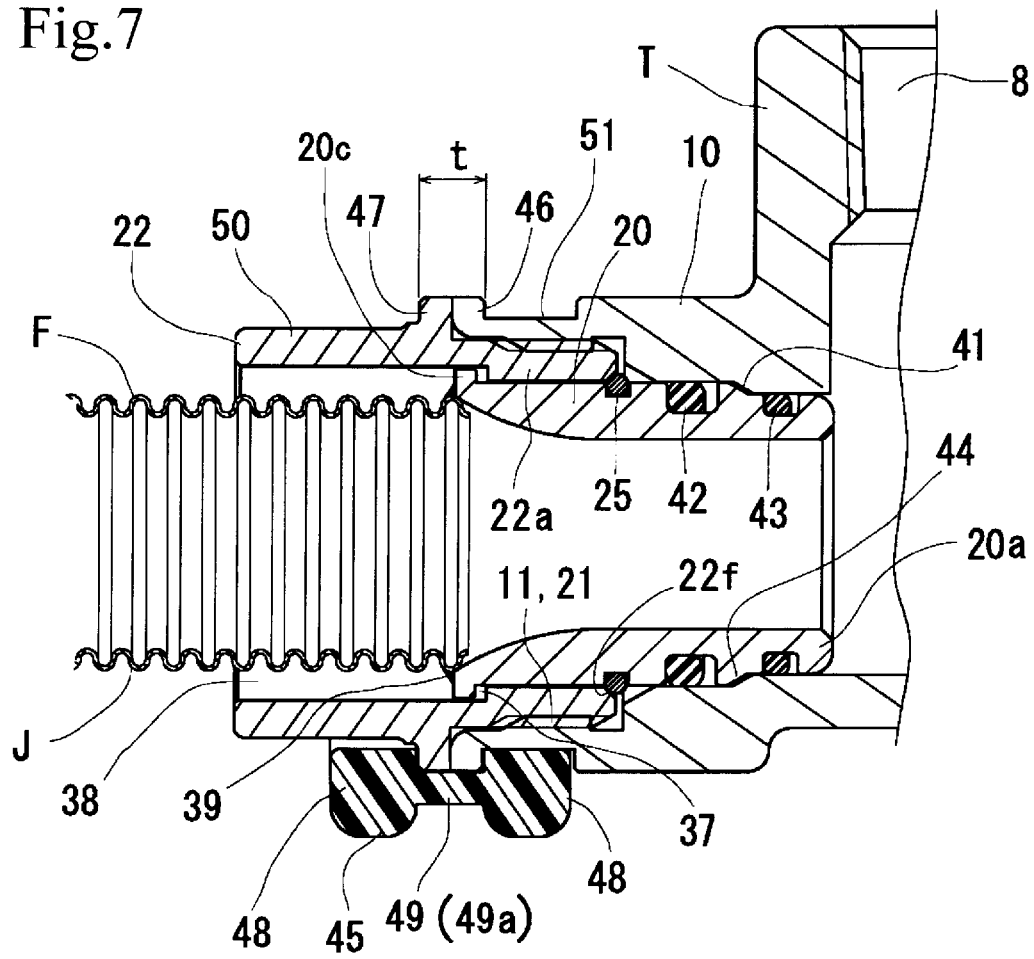
FIG. 7 is a cross-sectional view illustrating a connection structure for fire extinguishing system piping according to a second embodiment.

In addition, as illustrated in FIG. 7, the step surface 41 and the step portion 44 engage each other in the state in which the male thread 21 and the female thread 11 are connected together. During the maintenance operation of the water piping P or the like, the water filled in the piping may be drained by vacuum suction and the negative pressure causes the joint cylinder 20 to move toward the multi-port joint T. The engagement between the step surface 41 and the step portion 44 prevents this movement.

Figure 8A:
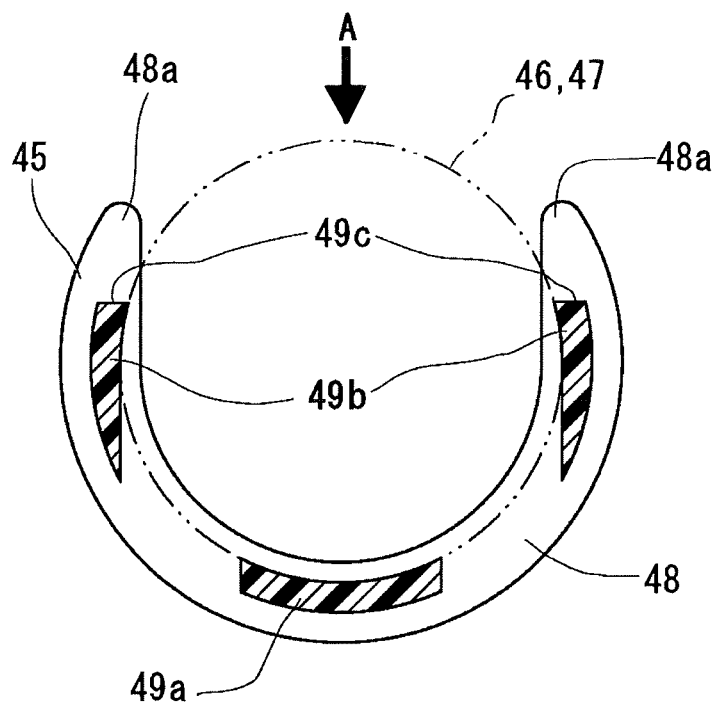
FIG. 8A is a cross-sectional view of the indicator and FIG. 8B illustrates an exterior of the indicator when viewed in a direction of arrow A in FIG. 8A.
Figure 8B:
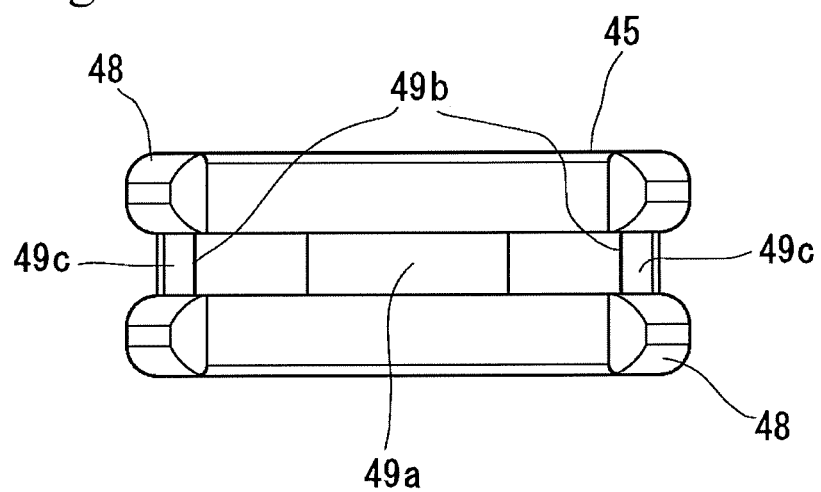

As illustrated in FIGS. 7 and 8, the male piping member 22 is shaped into a circular pipe and has the male thread 21 formed on an end thereof, in other words, formed on the outer periphery of the end that is inserted into the connection opening portion 10. The male thread 21 is engageable with the female thread 11. The other end, in other words, the end that is not inserted into the connection opening portion 10, is formed as a grip portion 50 of which the cross-sectional shape is a hexagon or an octagon. A flanged portion 47, which serves as a "first annular projection", is formed at a position between the male thread 21 and the grip portion 50. The flanged portion 47 is formed as an annular projection that extends in the circumferential direction of the male piping member 22. In the state in which the male thread 21 and the female thread 11 are screwed together, the flanged portion 47 comes into contact with a flanged portion 46 that is formed at the opening edge portion 10a of the connection opening portion 10. The flanged portion 46 serves as a "second annular projection". The flanged portion 47 has an abutment surface 47a, which serves as an "annular side surface", and the flanged portion 46 has an abutment surface 46a, which serves as another "annular side surface". In the state in which the abutment surface 47a and the abutment surface 46a are in contact with each other, the flanged portion 47 and the flanged portion 46 form a "flanged projection". The outside diameter of the flanged portion 47 is equal to the outside diameter of the flanged portion 46. In addition, the outside diameter of the flanged portion 47 is larger than the outside diameter of each of the male thread 21 and the grip portion 50.

The joint cylinder 20 is rotatably accommodated inside the male piping member 22. The protruding portion 20a is formed on the joint cylinder 20. The protruding portion 20a protrudes outward from the end of the male piping member 22, in other words, from the end to be inserted into the connection opening portion 10. The above-described third O-ring 42 and fourth O-ring 43 are disposed on the outer periphery of the protruding portion 20a. The flexible pipe F is connected to the other end of the joint cylinder 20 that is opposite to the protruding portion 20a. The other end of the flexible pipe F is connected to a sprinkler head S (FIG. 1). The joint cylinder 20 and the flexible pipe F are welded together to form a connection portion 39. The connection portion 39 is accommodated inside the male piping member 22 and thereby protected from external forces. Accordingly, the inner periphery of the male piping member 22 that covers the connection portion 39 constitutes a "tubular cover portion".

An allowance gap 38 is formed between the inner periphery of the grip portion 50 of the male piping member 22 and the outer periphery of the flexible pipe F. The range of motion (bendable range) of the flexible pipe F is not beyond the allowance gap 38. In other words, when the flexible pipe F is bent, the flexible pipe F comes into contact with an abutment surface 22e, which is the inner periphery of the grip portion 50, and the abutment surface 22e restricts further bending of the flexible pipe F. Accordingly, even when the flexible pipe F is subjected to a load, such as an excessive twist or bending, before or after connection between the multi-port joint T and the male piping member 22, the flexible pipe F cannot be bent beyond the allowance gap 38, which can prevent breakage of the connection portion 39. The length of the portion of the flexible pipe F that is accommodated in the grip portion 50 is 0.5 to 3 times, preferably 1 to 2 times, of the outside diameter of the flexible pipe F. Excessive bending of the flexible pipe F can be thereby prevented while suppressing an increase in the length of the male piping member 22 and the joint cylinder 20.

The end of the joint cylinder 20 to be connected to the flexible pipe F is formed into a flange 20c that projects outward. The flange 20c is engageable with an end surface of a step portion 22c that is formed inside the male piping member 22. The outside diameter of the flange 20c is less than the inside diameter of the grip portion 50 of the male piping member 22 into which the flexible pipe F is inserted. The joint cylinder 20 is thereby rotatable relative to the male piping member 22. The step portion 22c extends to the end surface of the male piping member 22 that is near the male thread 21. The inside diameter of the step portion 22c is less than the inside diameter of the grip portion 50 into which the flexible pipe F is inserted. Moreover, the gap 21a is provided between the inner periphery of the step portion 22c and the outer periphery of the joint cylinder 20. The gap 21a allows rotation of the joint cylinder 20 relative to the male piping member 22. Thus, the male piping member 22 and the joint cylinder 20 are rotatable relative to each other around the central axis thereof.

As illustrated in FIG. 7, a gap 37 is provided between the flange 20c and the end surface of the step portion 22c in the state in which the male thread 21 and the female thread 11 are screwed together. The gap 37 enables smooth rotation of the joint cylinder 20. More specifically, if the flange 20c and the end surface of the step portion 22c come into contact with each other without providing the gap 37, a portion with which the joint cylinder 20 is in contact during rotation drags, and may prevent, rotation of the joint cylinder 20. However, providing the gap 37 enables the joint cylinder 20 to rotate smoothly.

The snap ring 25 is disposed in an annular groove formed on the outer periphery of an intermediate portion of the joint cylinder 20. The snap ring 25 prevents the joint cylinder 20 from coming off the male piping member 22 and also allows rotation of the joint cylinder 20 and the male piping member 22 relative to each other. After the male thread 21 and the female thread 11 are screwed together, the joint cylinder 20 is rotatable relative to the male piping member 22. Even in the state in which the snap ring 25 is stuck between the end of the male thread 21 and a step portion 19 of the multi-port joint T, the joint cylinder 20 can rotate relative to the snap ring 25.

An inclined surface 22f is disposed on the inner periphery at the end of the male piping member 22 near the male thread 21. The inclined surface 22f serves as a stop portion with which the snap ring 25 comes into contact. When the fluid pressure in the piping presses the joint cylinder 20 toward the flexible pipe F after the male thread 21 and the female thread 11 are connected, the inclined surface 22f supports the snap ring 25 and presses the snap ring 25 toward the central axis of the joint cylinder 20. This can center the joint cylinder 20 that is retained inside the holder portion 22a of the male piping member 22 via the gap 21a that enables rotation. The joint cylinder 20 is thereby aligned with the central axis of the connection opening portion 10. As a result, the entire circumferences of the third O-ring 42 and the fourth O-ring 43 can be in appropriate and balanced press-contact with the respective straight portions 10b and 10c and stop water leakage.

An indicator 45, which is illustrated in FIGS. 7 and 8, is mounted so as to nip the side surface of the flanged portion 46 of the connection opening portion 10 and the side surface of the flanged portion 47 of the male piping member 22. The indicator 45 is formed such that a plurality of retaining portions 49 that press and hold the flanged portions 46 and 47 are formed between a pair of rings 48 that are shaped into horseshoes or C shapes.

As illustrated in FIG. 7, the distance between the rings 48 is set equal to the thickness t of the "flanged projection" in the state in which the opposing abutment surfaces 46a and 47a of the respective flanged portions 46 and 47 are in contact with each other. In other words, the distance between the outer periphery portion of the grip portion 50 adjacent to the flanged portion 47 ("first engagement portion") and a groove 51 of the connection opening portion 10 ("second engagement portion") is equal to the thickness t. The distance is, in other words, the length of the retaining portions 49 between the rings 48. When a worker mounts the indicator 45 onto the flanged portions 46 and 47 after the male thread 21 and the female thread 11 are screwed together but the flanged portions 46 and 47 are not fitted into the rings 48, the worker can recognize that the screw engagement is not sufficient between the male thread 21 and the female thread 11.

The retaining portions 49 includes a second retaining portion 49a and two first retaining portions 49b. The second retaining portion is disposed at a position farthest away from a discontinued portion, in other words, away from a portion between ends 48a of each ring 48. The first retaining portions 49b are disposed at positions between the second retaining portion 49a and the discontinued portion. The first retaining portions 49b are disposed so as to oppose each other and interpose the arcuate outer peripheries of the flanged portions 46 and 47 therebetween. In FIG. 8A, the outer peripheries of the flanged portions 46 and 47, which are indicated by the dash-dot-dot line, are pressed and held by three retaining portions (49a, 49b, 49b). The end of each first retaining portion 49b near the end 48a is formed as a "curved end" that is slightly curved inward and prevents the three retaining portions (49a, 49b, 49b) from detaching from the flanged portions 46 and 47 that are inserted inside the three retaining portions.

As illustrated in FIG. 8A, the indicator 45 is mounted on the flanged portions 46 and 47 in such a manner that the second retaining portion 49a is positioned downward, in other words, at a position facing the floor in a room so as to be seen easily from below. Thus, the indicator 45, which is installed at height in a room, can be observed easily by an inspector on the floor.

The indicator 45 is formed so as to be mountable only on the flanged portions 46 and 47. An "unmountable portion" for the indicator 45 is disposed in the vicinity of each of the flanged portions 46 and 47. More specifically, the diameter of the grip portion 50 near the flanged portion 47 is smaller than the inside diameter of each ring 48, which thereby forms an unmountable portion for the indicator 45 (a "first unmountable portion"). The inside diameter of each ring 48 is larger than the outside diameter of the grip portion 50 near the flanged portion 47. As a result, if the indicator 45 is mounted on the grip portion 50 and the second retaining portion 49a is turned downward, the indicator 45 cannot stay on the grip portion 50. Although the second retaining portion 49a may be placed on top of the grip portion 50, the indicator 45 falls off by slight vibration and cannot be mounted on the grip portion 50 stably for a long period of time. Moreover, since the ends 48a are disposed so as to face in a downward direction, the inspector recognizes easily that the installation direction of the indicator is opposite.

Alternatively, one of the two first retaining portions 49b of the indicator 45 can be made larger and heavier than the other. When the second retaining portion 49a is placed on the grip portion 50, the heavier one of the first retaining portions 49b moves downward, which causes the indicator 45 to fall off the grip portion 50. Thus, the indicator 45 cannot be mounted on the grip portion 50.

The indicator 45 cannot be mounted on the outer periphery portion 10d of the connection opening portion 10 near the groove 51, either. In other words, the outside diameter of the outer periphery portion 10d is larger than the inside diameter of the rings 48, which makes the outer periphery portion 10d a "second unmountable portion" on which the indicator 45 cannot be mounted. If the indicator 45 is forced to be mounted on the outer periphery portion 10d of the connection opening portion 10, a pair of the ends 48a of the indicator 45 needs to be opened widely, which results in breaking the indicator 45. Thus, the indicator 45 cannot be installed on the outer periphery portion 10d.

Figure 9:
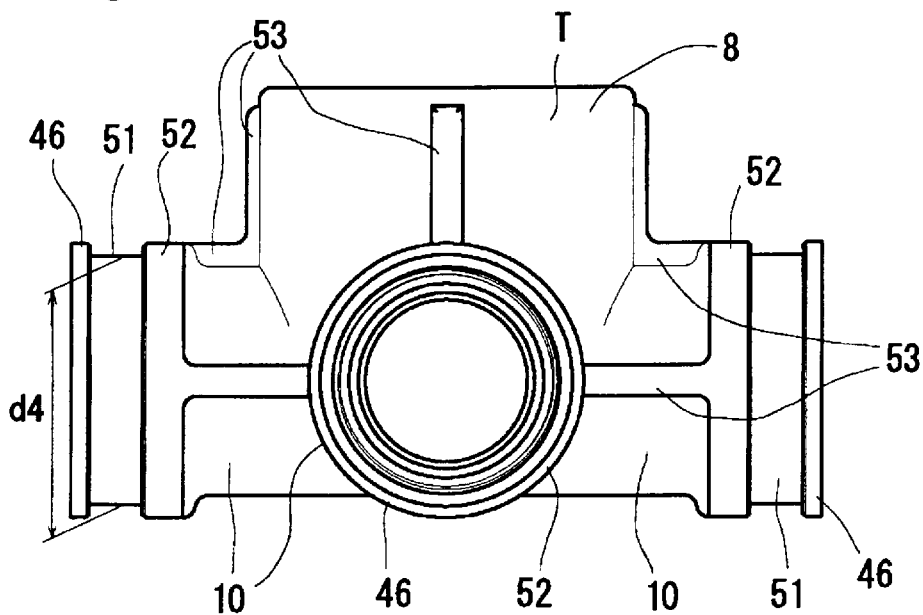
FIG. 9 is a view illustrating an exterior of a multi-port joint illustrated in FIG. 7.
Figure 10:
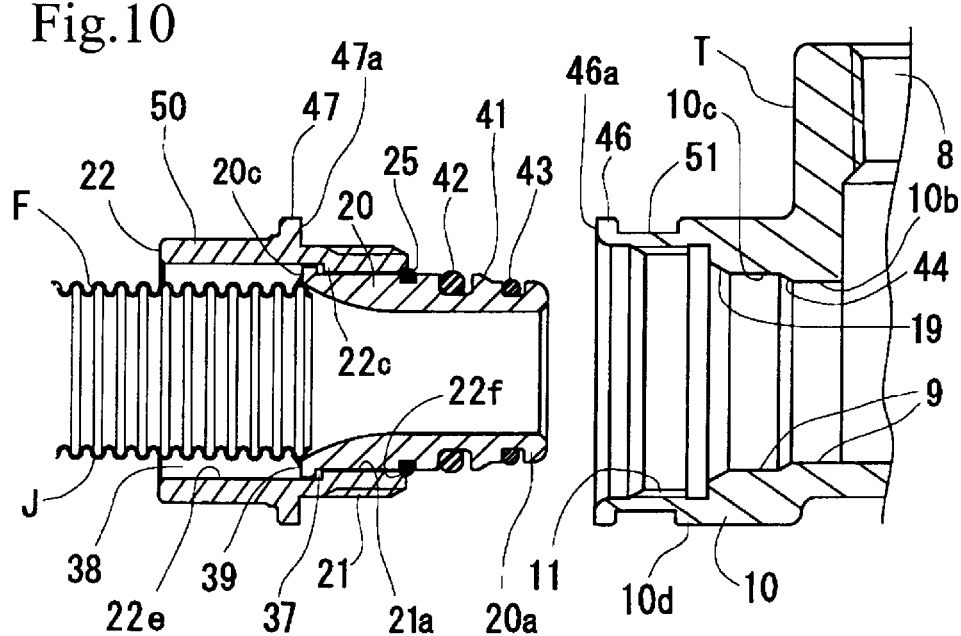
FIG. 10 is a cross-sectional view illustrating a state before the fire extinguishing system piping in FIG. 7 is connected.
Figure 11:
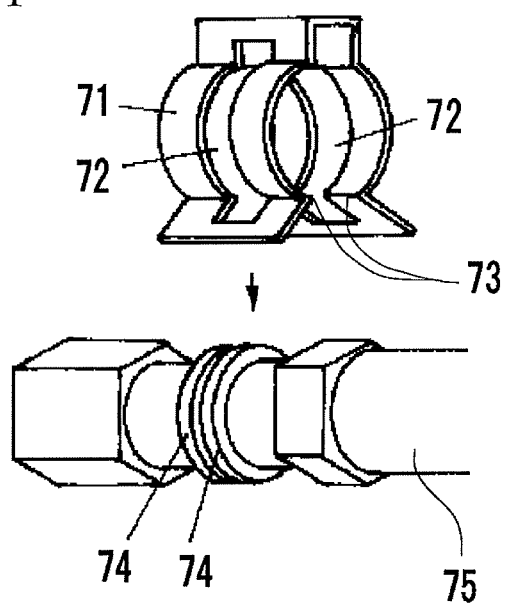
FIG. 11 is an exterior view illustrating a connection structure for fire extinguishing system piping according to a known example.

In the multi-port joint T illustrated in FIG. 9, a circumferential protrusion 52 that prevents mounting of the indicator 45 is formed around the outer periphery portion 10d of the connection opening portion 10. The circumferential protrusion 52 adjoins the groove 51, and the outside diameter of the circumferential protrusion 52 is larger than the inside diameter of the rings 48. Thus, the rings 48 cannot be mounted thereon. A plurality of ribbed protrusions 53 are also formed on the multi-port joint T. The ribbed protrusions 53 are formed from the circumferential protrusion 52 of one connection opening portion 10 to the circumferential protrusions 52 of adjacent connection opening portions 10. Similarly, a ribbed protrusion 53 is formed from the connection opening portion 10 toward a top portion of the multi-port joint T.

As described above, the indicator 45 can be mounted only at the position of the flanged portions 46 and 47 and only in the state in which the flanged portions 46 and 47 are in contact with each other. Accordingly, when the indicator 45 is mounted, it can be determined from a distance that the male thread 21 and the female thread 11 are in an appropriate engagement state.

According to the connection structure for the fire extinguishing system piping of the second embodiment described above, the male piping member 22 includes the joint cylinder 20 having the protruding portion 20a that protrudes further toward the inside of the connection opening portion 10 than the male thread 21 and is inserted deeper into the connection opening portion 10 than the female thread 11. The male piping member 22 also includes the third O-ring 42 and the fourth O-ring 43 that come into contact with the outer periphery of the protruding portion 20a and with the inner periphery of the connection opening portion 10 and thereby seal the engagement portion between the male thread 21 and the female thread 11. The third O-ring 42 and the fourth O-ring 43 disposed on the protruding portion 20a come into contact with the inner periphery of the connection opening portion 10 and cut off water at positions deeper than the engagement portion between the male thread 21 and the female thread 11. Thus, water leakage to the engagement portion can be reliably prevented. In addition to the above-described effects, the same advantageous effects as those described in the first embodiment can be also obtained in the present embodiment.

MODIFICATION EXAMPLES OF EMBODIMENTS

In the above embodiments, the connection structure between the multi-port joint T and the flexible pipe F are described. However, the present invention may be applied to connection structures for various types of fire extinguishing system piping. For example, the present invention may be applied to an elbow joint and a tee joint in place of the multi-port joint T. In addition, for example, one of the connection opening portions of an elbow joint can be formed to have a tapered thread and the other connection opening portion can be configured similarly to the connection opening portion 10 (female) described above. One or two openings of a tee joint that has three connection openings can be formed to have tapered threads and the rest can be configured similarly to the connection opening portions 10.

REFERENCE SIGNS LIST 5 ceiling framework
6 metal fixture
8 connection opening portion
9 sealing surface
10 connection opening portion (female piping member)
10a opening edge (second annular projection)
10b straight portion
10c straight portion
10d outer periphery portion (second unmountable portion)
11 female thread
12 first O-ring (sealing member)
13 locking ring
13a lock portion
14 annular groove
15 lock hole
16 recess (second engagement portion)
20 joint cylinder (joint member)
20a protruding portion
20b joint portion
20c flange
21 male thread
21a gap
22 male piping member
22a holder portion
22b flanged portion (first annular projection)
22c step portion
22d outer periphery portion
22f inclined surface
22e abutment surface
23 step
24 step
25 snap ring
26 second O-ring (sealing member)
27 sealing surface
28 nut (tubular cover portion)
28a female thread (connection portion)
29 male thread (connection portion)
30 groove
30a inclined surface
30b contact surface
31 recess (first engagement portion)
32 indicator
33 projection
33a end
34 thin-walled portion
35 recess
37 gap
38 allowance gap
39 connection portion
41 step surface
42 third O-ring (sealing member)
43 fourth O-ring (sealing member)
44 step portion
45 indicator
46 flanged portion (second annular projection)
46a abutment surface (annular side surface)
47 flanged portion (first annular projection)
47a abutment surface (annular side surface)
48 ring
48a end
50 grip portion (first unmountable portion)
51 groove
52 circumferential protrusion
53 ribbed protrusion
C ceiling panel
F metal flexible pipe (flexible tube)
P water piping
S sprinkler head
T multi-port joint

The invention claimed is:
1. A connection structure for fire extinguishing system piping, comprising:
a male piping member that is used for the fire extinguishing system piping and has a male thread;
a female piping member that is used for the fire extinguishing system piping and has a female thread into which the male thread is screwed; and
an indicator, wherein
the male piping member and the female piping member are connected to each other by screwing the male thread and the female thread together,
the male piping member includes
a joint member having a protruding portion that protrudes further toward an inside of the female piping member than the male thread and is inserted deeper into the female piping member than the female thread, a sealing member that comes into contact with an outer periphery of the protruding portion and with an inner periphery of the female piping member and seals a screw engagement portion between the male thread and the female thread against water leakage into the inside of the female piping member, and a first engagement portion on an outer periphery of the male piping member, a second engagement portion on an outer periphery of the female piping member, the indicator includes a pair of rings that engage respective ones of the first engagement portion and the second engagement portion in a state in which the male piping member and the female piping member are connected together and a retaining portion that connects the pair of the rings together and has a length corresponding to a distance between the first engagement portion and the second engagement portion that are disposed adjacently, and the male piping member further includes a first unmountable portion that is disposed at a position adjacent to the first engagement portion and has an outside diameter different from respective inside diameters of the rings and that the rings are unable to engage.

2. The connection structure for fire extinguishing system piping according to claim 1, wherein the female piping member further includes a second unmountable portion that is disposed at a position adjacent to the second engagement portion and has an outside diameter different from respective inside diameters of the rings and that the rings are unable to engage.

3. The connection structure for fire extinguishing system piping according to claim 1, wherein each of the pair of the rings is shaped like a horseshoe and has curved ends at respective ends thereof, and the curved ends are curved inward and serve to prevent the pair of the rings from coming off the first engagement portion and the second engagement portion.

4. The connection structure for fire extinguishing system piping according to claim 1, wherein the pair of the rings holds the first engagement portion and the second engagement portion so as to press and nip the first engagement portion and the second engagement portion in a state in which the pair of the rings engage the first engagement portion and the second engagement portion.

5. The connection structure for fire extinguishing system piping according to claim 1, wherein the retaining portion has a pair of first retaining portions that are disposed on a circumference of the pair of the rings and a second retaining portion that is disposed at a position between the pair of the first retaining portions on the circumference of the pair of the rings.

6. The connection structure for fire extinguishing system piping according to claim 1, wherein the male piping member has a holder portion that holds the joint member rotatably.

7. The connection structure for fire extinguishing system piping according to claim 1, wherein the male piping member has a first annular projection having a first annular side surface that extends in a circumferential direction of the male piping member at a position adjacent to the first engagement portion on a side of the male piping member to which the female piping member is connected, the female piping member has a second annular projection having a second annular side surface that extends in the circumferential direction of the female piping member at a position adjacent to the second engagement portion on a side of the female piping member to which the male piping member is connected, and the first annular projection and the second annular projection come into contact with each other in a state in which the male piping member and the female piping member are connected together and thereby form a flanged projection in which the pair of the rings nip the first annular side surface of the first annular projection and the second annular side surface of the second annular projection while the retaining portion is in press-contact with outer peripheries thereof.

8. The connection structure for fire extinguishing system piping according to claim 1, wherein the joint member has a flexible tube that is connected to an end of the joint member that is opposite to the protruding portion to be inserted into the female piping member.

9. The connection structure for fire extinguishing system piping according to claim 8, wherein the male piping member has a tubular cover portion that covers a connection portion between the joint member and the flexible tube.

10. The connection structure for fire extinguishing system piping according to claim 9, further comprising an allowance gap that is provided between the tubular cover portion and the connection portion and that allows bending deformation of the flexible tube.

11. The connection structure for fire extinguishing system piping according to claim 1, wherein the female piping member is a connection opening portion of a multi-port joint.

12. A connection structure for fire extinguishing system piping, comprising:

a male piping member that is used for the fire extinguishing system piping and has a male thread;

a female piping member that is used for the fire extinguishing system piping and has a female thread into which the male thread is screwed; and an indicator, wherein the male piping member and the female piping member are connected together by screwing the male thread and the female thread together, the male piping member includes a joint member having a protruding portion that protrudes further toward an inside of the female piping member than the male thread and is inserted deeper into the female piping member than the female thread, a sealing member that comes into contact with an outer periphery of the protruding portion and with an inner periphery of the female piping member and seals a screw engagement portion between the male thread and the female thread against water leakage into the inside of the female piping member, and a first engagement portion on an outer periphery of the male piping member, a second engagement portion on an outer periphery of the female piping member, the indicator includes a pair of rings that engage respective ones of the first engagement portion and the second engagement portion in a state in which the male piping member and the female piping member are connected together and a retaining portion that connects the pair of the rings together and has a length corresponding to a distance between the first engagement portion and the second engagement portion that are disposed adjacently, and the female piping member further includes a second unmountable portion that is disposed at a position adjacent to the second engagement portion and has an outside diameter different from respective inside diameters of the rings and that the rings are unable to engage.

13. The connection structure for fire extinguishing system piping according to claim 12, wherein each of the pair of the rings is shaped like a horseshoe and has curved ends at respective ends thereof, and the curved ends are curved inward and serve to prevent the pair of the rings from coming off the first engagement portion and the second engagement portion.

14. The connection structure for fire extinguishing system piping according to claim 12, wherein the pair of the rings holds the first engagement portion and the second engagement portion so as to press and nip the first engagement portion and the second engagement portion in a state in which the pair of the rings engage the first engagement portion and the second engagement portion.

15. The connection structure for fire extinguishing system piping according to claim 12, wherein the retaining portion has a pair of first retaining portions that are disposed on a circumference of the pair of the rings and a second retaining portion that is disposed at a position between the pair of the first retaining portions on the circumference of the pair of the rings.

16. The connection structure for fire extinguishing system piping according to claim 12, wherein the male piping member has a holder portion that holds the joint member rotatably.

17. The connection structure for fire extinguishing system piping according to claim 12, wherein the male piping member has a first annular projection at a position adjacent to the first engagement portion on a side of the male piping member to which the female piping member is connected, the female piping member has a second annular projection at a position adjacent to the second engagement portion on a side of the female piping member to which the male piping member is connected, and the first annular projection and the second annular projection come into contact with each other in a state in which the male piping member and the female piping member are connected together and thereby form a flanged projection in which the pair of the rings nip respective annular side surfaces of the first annular projection and the second annular projection while the retaining portion is in press-contact with outer peripheries thereof.

18. The connection structure for fire extinguishing system piping according to claim 12, wherein the joint member has a flexible tube that is connected to an end of the joint member that is opposite to the protruding portion to be inserted into the female piping member.

19. The connection structure for fire extinguishing system piping according to claim 18, wherein the male piping member has a tubular cover portion that covers a connection portion between the joint member and the flexible tube.

20. The connection structure for fire extinguishing system piping according to claim 19, further comprising an allowance gap that is provided between the tubular cover portion and the connection portion and that allows bending deformation of the flexible tube.

21. The connection structure for fire extinguishing system piping according to claim 12, wherein the female piping member is a connection opening portion of a multi-port joint.

\* \* \* \* \*